United States Patent
Hoeller et al.

(10) Patent No.: US 11,221,206 B2
(45) Date of Patent: Jan. 11, 2022

(54) DEVICE FOR MEASURING OBJECTS

(71) Applicant: Carl Zeiss AG, Oberkochen (DE)

(72) Inventors: Frank Hoeller, Aalen (DE); Christoph-Hilmar Graf vom Hagen, Duesseldorf (DE)

(73) Assignee: CARL ZEISS AG, Oberkochen (DE)

( * ) Notice: Subject to any disclaimer, the term of this patent is extended or adjusted under 35 U.S.C. 154(b) by 489 days.

(21) Appl. No.: 16/305,608

(22) PCT Filed: May 23, 2017

(86) PCT No.: PCT/EP2017/062445
§ 371 (c)(1),
(2) Date: Nov. 29, 2018

(87) PCT Pub. No.: WO2017/207364
PCT Pub. Date: Dec. 7, 2017

(65) Prior Publication Data
US 2020/0326175 A1    Oct. 15, 2020

(30) Foreign Application Priority Data

May 30, 2016   (DE) .......................... 102016109919.8

(51) Int. Cl.
*G01B 11/00*   (2006.01)
*G01S 19/45*   (2010.01)

(52) U.S. Cl.
CPC ............ *G01B 11/005* (2013.01); *G01S 19/45* (2013.01); *G01B 2210/50* (2013.01); *G01B 2210/52* (2013.01)

(58) Field of Classification Search
CPC ..... G01B 11/005; G01B 11/24; G01B 11/002; G01B 2210/52; G01B 2210/50; G01S 19/45; G06T 7/579
See application file for complete search history.

(56) References Cited

U.S. PATENT DOCUMENTS 5,506,683 A * 4/1996 Yang .................. G01B 11/2504
                                                       356/606
2008/0303713 A1* 12/2008 Han ........................ G01S 19/45
                                                       342/357.28

(Continued)

FOREIGN PATENT DOCUMENTS

DE     102010032467 A1    2/2012
DE     102018201211 A1 *  8/2019   ......... G02B 13/0065

(Continued)

OTHER PUBLICATIONS

Gebre, Biruk A, et al., "Remotely Operated and Autonomous Mapping System (ROAMS)", Technologies for Practical Robot Applications, IEEE International Conference, IEEE, Piscataway, NJ, USA, Nov. 9, 2009, pp. 173-178.

(Continued)

*Primary Examiner* — Sang H Nguyen
(74) *Attorney, Agent, or Firm* — Murphy, Bilak & Homiller, PLLC (57) ABSTRACT

A device for measuring objects is provided, said device comprising a mobile base such that it is movable to objects to be measured. Then, the object may be measured by means of a measuring head fastened to a kinematic unit.

18 Claims, 4 Drawing Sheets

(56) References Cited

U.S. PATENT DOCUMENTS

| | | | | |
|---|---|---|---|---|
| 2009/0046895 A1* | 2/2009 | Pettersson | ............ | G01B 11/005 |
| | | | | 382/106 |
| 2015/0163993 A1* | 6/2015 | Pettersson | ............ | A01D 34/008 |
| | | | | 701/28 |
| 2015/0269792 A1 | 9/2015 | Wood | | |
| 2016/0288330 A1* | 10/2016 | Konolige | ............. | H04N 13/254 |
| 2017/0191822 A1* | 7/2017 | Becker | .................... | G01S 17/89 |
| 2018/0018778 A1* | 1/2018 | Haverkamp | ......... | G01B 21/042 |
| 2018/0283017 A1* | 10/2018 | Telleria | ............... | E04F 21/1652 |

FOREIGN PATENT DOCUMENTS

| | | | |
|---|---|---|---|
| EP | 2023077 A1 | 2/2009 | |
| EP | 2667151 A1 | 11/2013 | |
| EP | 2896931 A1 | 7/2015 | |

OTHER PUBLICATIONS

Jörgl, Thilo, "Automotive: BMW places its stake on transport robots", Logistik Heute, http://www.logistik-heute.de, Mar. 17, 2016, 2 pages.
Unknown, Author, "An Efficient Mobile Robot for Transportation", MiR100, www.iis-automation.de, Mar. 2016, 2 pages.
Unknown, Author, "Spatial Analyzer", Product Brochure, Hexagon Metrology, URL: https://www.google.de/search?q=SpatialAnalyzer_brochure_en.pdf&ie=utf-8&oe=utf-8&gws_rd=cr&ei=ILauWM78Oob4UvbrjKgJ, Jun. 29, 2016, 8 pages.

* cited by examiner

DEVICE FOR MEASURING OBJECTS

TECHNICAL FIELD

The present application relates to a device for measuring objects which is usable, in particular, in the industrial manufacture of objects such as, e.g., motor vehicles or aircraft or for measuring industrial devices, without however being restricted thereto.

BACKGROUND

In industry, various devices for measuring objects, e.g., industrially manufactured products, are known. By way of example, such devices can serve to carry out the final inspection of a produced product, or else to carry out an inspection during the manufacturing process.

Figure 1:
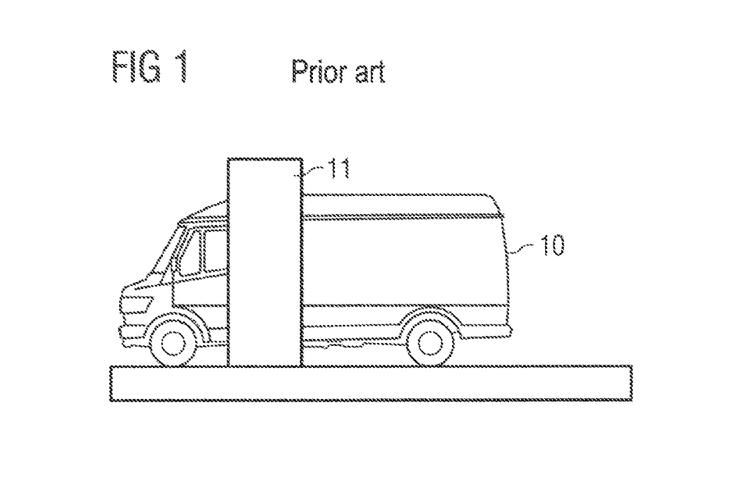
FIG. 1 shows a device for measuring objects according to the prior art.

Coordinate measuring machines are examples of such devices. Such coordinate measuring machines usually comprise a measuring head system having a sensor and a displacement or positioning system, by means of which the measuring head can be moved along an object to be measured. Such conventional coordinate measuring machines are stationary and require the coordinate measuring machine to be larger than the object to be measured. Moreover, the object to be measured must be brought to the coordinate measuring machine. For illustration purposes, FIG. 1 here shows an example in which a motor vehicle 10 is driven through such a conventional coordinate measuring machine 11.

Laser-tracker-based methods for measuring large objects, as are used in the aviation industry, are used in a further conventional approach. Although these facilitate a relatively high accuracy during the measurement, they are slow and not able to be automated or only able to be automated with quite significant difficulties. Moreover, they require well-trained staff and a clear view between a sensor and a base station, which can only be realized with difficulties in industrial surroundings and, in particular, on robots. Corresponding devices are commercially available.

Articulated measuring arms are known as transportable measurement systems. By way of example, such a measurement system with an articulated measuring arm is disclosed in DE 196 37 54 A1. Such measuring arms are able to be handled in a comparatively simple and intuitive manner. However, automation is usually not present, opposing the repeatability of measurement processes. Moreover, hand-led articulated measuring arms are restricted in terms of the measurement volume by the arm length of the measuring arm.

Moreover, use is made of robots with calibration methods and model-assisted correction of a robot pose (i.e., current position and orientation of the robot). As a rule, accuracies of greater than 1 mm are only achievable in the form of reproducibility from measurement to measurement, but not as absolute positioning, in the case of such robots. Consequently, such systems are hardly usable for flexible measurement problems.

SUMMARY

According to a first aspect, a device for measuring objects is provided, comprising a mobile base for moving the device through a spatial region, a kinematic unit attached to the mobile base and a measuring head attached to the kinematic unit, wherein the kinematic unit is configured to move the measuring head relative to the mobile base, wherein the measuring head comprises a sensor for measuring objects.

The provision of a drivable base renders a high flexibility in respect of the use location possible, for example in factories.

The mobile base may have wheels or may be a rail-mounted mobile base. Hence, a movement even through relatively large spatial regions is possible.

Further, the device may comprise a navigation device for navigating the mobile base through the spatial region. Hence, the device may autonomously travel to different objects to be measured.

The navigation device may comprise a differential GPS system and/or a camera device. This renders an accurate navigation and/or an identification of objects to be measured possible.

The device may further comprise a controller and at least one sensor, wherein the controller is configured to control the kinematic unit on the basis of data of the at least one sensor for the purposes of moving the measuring head along the object. Hence, the kinematic unit can be controlled in accurate fashion.

The at least one sensor may comprise a first sensor of a first type and a second sensor of a second type that differs from the first type, wherein the controller may be configured to determine a pose of the measuring head on the basis of a combination of data of the first sensor and of the second sensor. This renders an increased accuracy when determining the pose possible.

The device as claimed in claim 6, wherein the controller is configured to determine the pose of the measuring head on the basis of control data of the device. This further increases the accuracy.

Combining can be implemented on the basis of a Bayesian algorithm, for example on the basis of a Kalman filter or an extended Kalman filter. Hence, various data sources can be fused to determine the pose.

The at least one sensor may comprise one or more sensors of the group consisting of a 2D camera, a 3D camera, a magnetic field sensor, an acceleration sensor and an angle sensor.

The measuring head may comprise an optical sensor.

In particular, the optical sensor may comprise a confocal chromatic multi-spot sensor.

According to a second aspect, a method is provided, comprising moving a device as described above for measuring objects to an object to be measured, and measuring the object.

Further, the method may comprise moving the device into different measurement positions for carrying out a plurality of measurements, and combining the plurality of measurements to form an overall measurement. This allows the measurement of large spatial regions and/or objects.

The overall measurement may be a 3D point cloud of a region of interest. This allows the provision of a 3D model.

By way of the bringing together into a uniform coordinate system, the data obtained in the process can be processed together.

Combining the plurality of measurements can be undertaken by linking (fusing) data of different sensors. This allows a high accuracy to be obtained.

The device, in particular the controller, can be configured to carry out the above-described method.

According to a third aspect, a computer program for controlling a device for measuring objects is provided, said computer program having a program code which, when executed on a controller, causes one of the methods described above to be carried out. As a result, the method can be implemented by way of appropriate programming. By way of example, the computer program may be provided on an electronically readable data medium.

BRIEF DESCRIPTION OF THE DRAWINGS

Embodiments are explained in greater detail below with reference to the accompanying drawings. In the Figures.

Various embodiments are explained in greater detail below with reference to the accompanying drawings. These embodiments serve merely for illustration and should not be interpreted as limiting. By way of example, a description of an embodiment with a plurality of components does not mean that all these components are necessary for implementing embodiments. Rather, some components may be omitted and/or replaced by alternative components in other embodiments. In addition to the explicitly illustrated and described components, further components, for example components used in conventional devices for measuring objects, may also be provided.

Features of different embodiments may be combined with one another, unless indicated otherwise. Variations and modifications which are described for one of the embodiments may also be applied to other embodiments.

Figure 2:
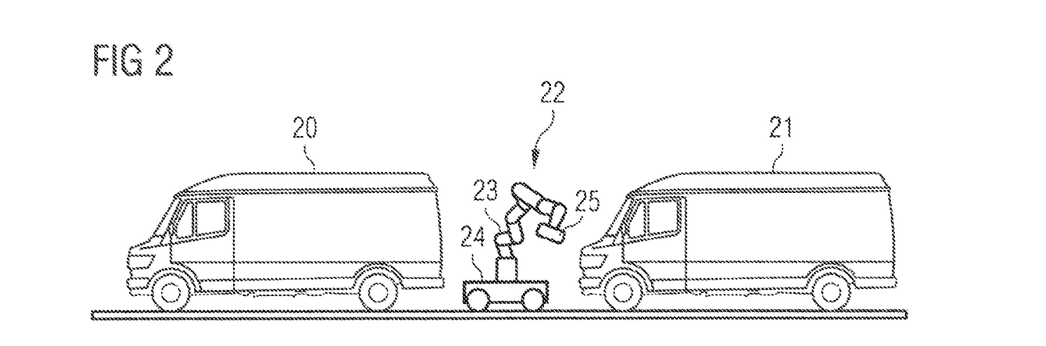
FIG. 2 shows a device for measuring objects according to one embodiment.

FIG. 2 illustrates an embodiment of a device 22 for measuring objects, for example motor vehicles 20, 21. Here, the device 22 comprises a mobile platform 24 with wheels, caterpillar tracks or other options for propagation and a drive such that the device 22 can travel through one or more enclosed spaces, or else outdoors, to objects 20, 21 to be measured. As will still be explained below, this travel may be implemented autonomously by the device 22 by means of a controller.

Furthermore, the device 22 has a measuring head 25, which is attached to a kinematic unit 23, for example a robotic arm. The kinematic unit 23 allows the measuring head 25 to be positioned accurately against the respective object to be measured, for example the motor vehicles 20 or 21. Here, the accurate determination of a pose of the measuring head 25 can be implemented as a combination of measurement data of a plurality of sensors, as will still be explained in more detail below. Here, a pose is understood to be the combination of position (e.g., by specifying x-, y- and z-coordinate) and orientation (e.g., by specifying angles). In the case of full mobility of the measuring head, such a pose may comprise 6 independent coordinates. Then, the actual measurement is implemented by means of the measuring head 25, which is also referred to as a sensor head. To this end, the measuring head 25 may comprise, for example, a confocal chromatic multi-spot sensor (CCMS), another type of optical sensor, a tactile sensor or any other suitable sensor that allows a desired measurement to be undertaken at the object to be measured.

Instead of a robot, use can also be made of other kinematic units, for example an autonomous horizontal-arm coordinate measuring machine. While the mobile platform is illustrated with wheels in this case, other solutions are also possible, such as, e.g., a securely installed mobile platform, which travels on rails. The latter is a possible approach, in particular, if a region within which the measurements should be carried out, for example within a factory hall, is well defined such that a displacement on rails is likewise possible.

Figure 3:
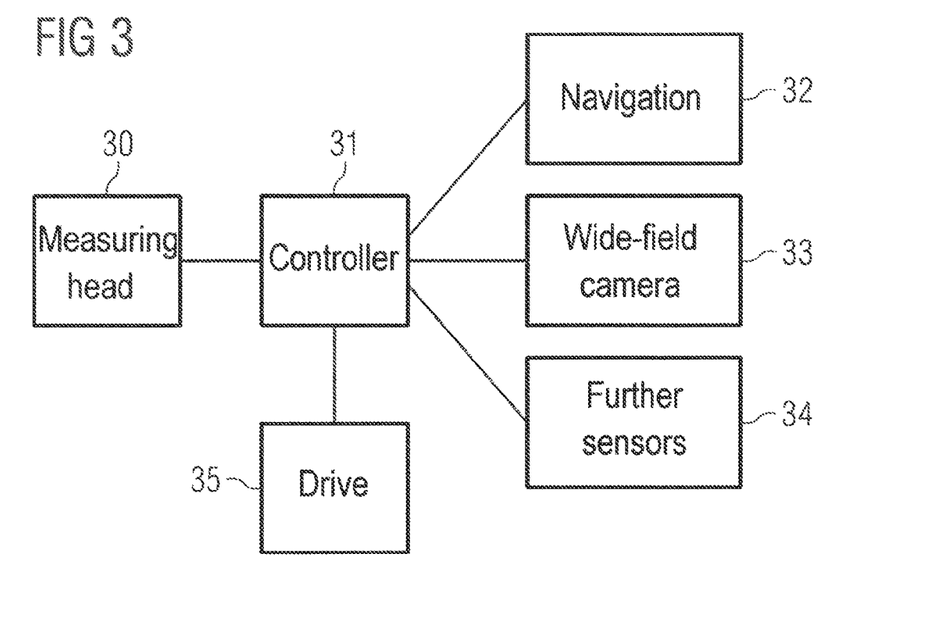
FIG. 3 shows a block diagram of a device for measuring objects according to one embodiment.

In order to explain this in more detail, FIG. 3 shows a block diagram, on the basis of which an example of a structure of a device, such as the device 22, is explained. Then, the functionality of the device will still be explained in more detail below, with reference to FIGS. 4 and 5.

In the embodiment of FIG. 3, a device for measuring objects comprises a measuring head 30 which, as explained for the measuring head 25, comprises one or more sensors for measuring the desired objects. The measurement is controlled by a controller 31. To this end, the controller 31 may have, e.g., one or more microcontrollers, microprocessors and the like, which are programmed by an appropriate computer program to control the device and carry out functions that are still explained in more detail below. An implementation by way of special hardware is also possible. It should be noted that the controller 31 of the device need not be implemented completely on the mobile platform 24. Rather, some of the control problems, for example calculations, may also be implemented on an external computing device, such as a computer, and may be transferred to a controller component on the platform by way of a suitable interface, for example a radio interface.

Furthermore, the device in FIG. 3 comprises a drive 35, which is used, for example, to move the mobile platform 24 of FIG. 2. Here, the drive 35 is controlled by the controller 31.

To this end, the device may comprise a navigation system 32, for example a differential GPS system, a navigation on the basis of camera images, a navigation on the basis of transmitters distributed in a space to be travelled by the device, and the like. Using such navigation devices, an autonomous navigation of the device in a space to be travelled, for example in factory halls, is possible with an accuracy to within less than 0.1 meters.

Furthermore, the device in FIG. 3 comprises a wide-field camera 33 (or a plurality of wide-field cameras) for recording overview images. Here, the wide-field camera 33 may also be a stereo camera for capturing three-dimensional images. These can be used for the navigation 32 and can moreover be used to position the measuring head 30 at a suitable position against an object to be measured. In embodiments, the accuracy of this position of the measuring head 30 lies in a region that is smaller than an image field of the measuring head 30 in the case of an optical sensor. Moreover, further sensors 34, for example acceleration sensors, angle sensors, combinations thereof, e.g., so-called inertial measurement units (IMUs), magnetometers, a thermometer for temperature compensation and the like, may be provided in the device, for example at the kinematic unit 22. A pattern-based projection camera may also be used as a further sensor, as is used in gesture identification systems, for example.

Figure 4:
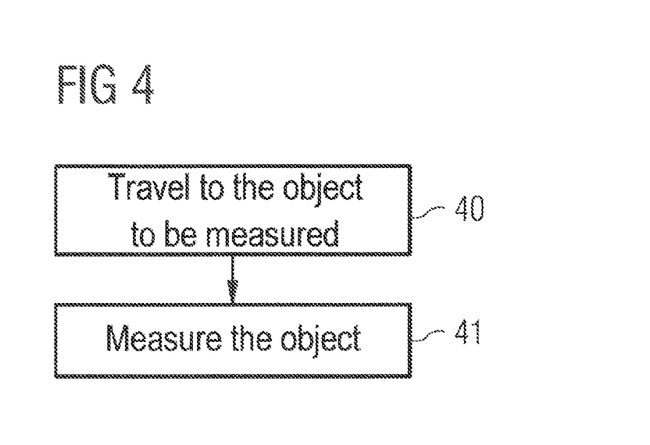
FIG. 4 shows a flowchart of a method according to one embodiment.

The procedure when measuring objects is now explained in more detail with reference to FIGS. 4 to 6. FIG. 4 shows a flowchart for illustrating a method according to one embodiment. In step 40, the measuring device travels to the object to be measured by means of the mobile platform 24. By way of example, as already explained with reference to FIG. 3, this may be implemented by means of autonomous navigation using, e.g., a differential GPS system and/or using camera images and/or using marks or transducers within the region to be travelled. By way of example, it is possible to achieve an accuracy to within less than 0.1 meters in factory halls in this case and it is possible to obtain a collision-free travel to the object to be measured and find the region, for example a volume, to be measured.

Then, the object is measured in step 41. Here, measuring should be understood to mean not only measuring the geometry; instead, it is likewise possible to carry out an optical measurement, for example of a spectrum, over the object, from the results of which it is possible to deduce, e.g., material defects and the like.

For measurement purposes, a navigation is initially implemented at the object to be measured in order to position the measuring head. To this end, use can be made of 2D images and/or 3D images, which can be recorded, for example, by the wide-field camera 33 in FIG. 3. As a result of this, it is possible to ensure that the object to be measured lies ideally in a measurement field of the head. In this case, a position accuracy can lie in the range of 1-10 mm and can depend on the size of the image field or measurement region of the measuring head. Then, this is followed by measurement of the object, for example of the three-dimensional topography of the object, using a suitable optical sensor such as a chromatic multi-spot sensor or any other suitable sensor. This measurement can be implemented in real time. Depending on the implementation of the measuring head, a measurement accuracy may lie in the range of 0.01-0.1 mm.

In order to measure larger objects, a navigation of the measuring head is then implemented along the object for the purposes of generating a connected measurement, in particular a connected point cloud. Here, the point cloud may be object-referenced, i.e., it may relate to a coordinate system of the object.

Such a navigation of the measuring head along the object is implemented, in particular, as a differential navigation of the measuring head and it preferably has an accuracy to within less than 0.1 mm. Such a differential navigation of the measuring head on the object may also be used in the case of stationary measurement devices. This accuracy is particularly preferred in order, in the case of a corresponding accuracy of a sensor of the measuring head, to measure the object overall in a connected manner with a corresponding accuracy.

To this end, a determination of the position of the measuring head that is as accurate as possible is desirable. In order to increase the accuracy of such a determination, it is possible in this case to combine data of a plurality of sensors and models. In particular, it is possible to link robot models and commands, which describe or control the movement of a kinematic unit such as the kinematic unit 23, trajectory calculations of the measuring head from stereo image sequences (for example, recorded by the wide-field camera 33, wherein use can be made here of a so-called "inverse structure from motion" algorithm), and/or temporal data from the device 22, for example data from movement sensors of the device such as acceleration sensors.

Depending on the measurement problem, it is then possible to transfer various point clouds or measurements, for example measurements on different objects, into a uniform coordinate system. In this way, it is possible to completely measure, e.g., regions of a space, for example a factory hall, or a plurality of objects. Such bringing together of the point clouds can be useful for trajectory data of the device (e.g., the device 22) and/or trajectory data of the kinematic unit 23. In particular, these trajectory data can describe the pose of the measuring head over time. Here, there can be a global post-optimization by using conventional stitching methods and/or using prior object knowledge, i.e., prior knowledge about the objects to be measured. By way of example, such prior knowledge may comprise prior knowledge that the objects are free from discontinuities, knowledge about the presence of edges, present CAD data, which describe the design of the objects, and the like.

Figure 5:
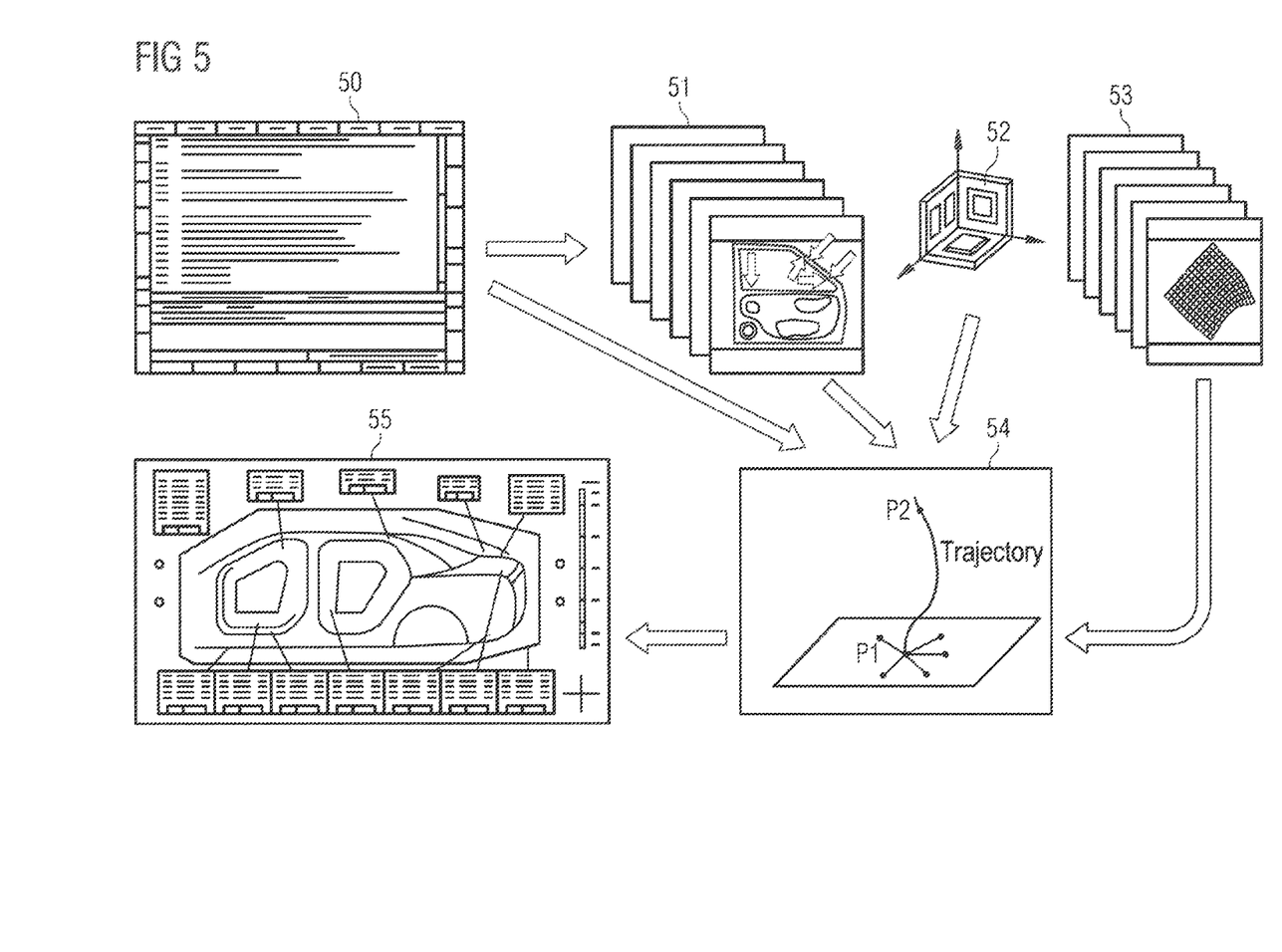
FIG. 5 shows a diagram for illustrating a data flow in a device and in a method according to one embodiment.

In order to elucidate this further, FIG. 5 shows, as an example, a data flow when using a confocal chromatic multi-spot sensor together with an inertial measurement unit (IMU), which is a spatial combination of a plurality of inertial sensors such as acceleration sensors and angle sensors, which may be arranged in the device according to the invention, and a stereo wide-field camera (e.g., the wide-field camera 33).

For control purposes, control commands 50 for the device are initially provided, said control commands moving and positioning the device including a kinematic unit. A stereo image stack, which is recorded following the positioning by way of the control commands 50, is denoted by 51. Reference sign 52 denotes the inertial measurement unit and reference sign 53 denotes a data stack recorded by means of the chromatic multi-spot sensor. The control commands, the stereo image data 51 and measurement data from the IMU 52 flow into an algorithm, which may be implemented in software and which combines (fuses) the various measurements in order to determine a trajectory of the measuring head (i.e., the pose of the measuring head over time), as denoted by 54, herefrom.

This combination of the data can preferably be implemented by a Bayesian algorithm such as a Kalman filter or an extended Kalman filter.

On the basis of the trajectory, the measurements of the multi-spot sensor (measurement stack 53) at various locations then can be combined into a single point cloud.

In relation to this combination of the measurements of the multi-spot sensor, there can also be a feature-based image evaluation of recorded images and measurements in order to find correspondences and combine the measurements in this way. It is also possible to use marks for the improved recognition of features, such as marks that are projected onto the objects to be measured. This may simplify the composition of individual point clouds.

Figure 6:
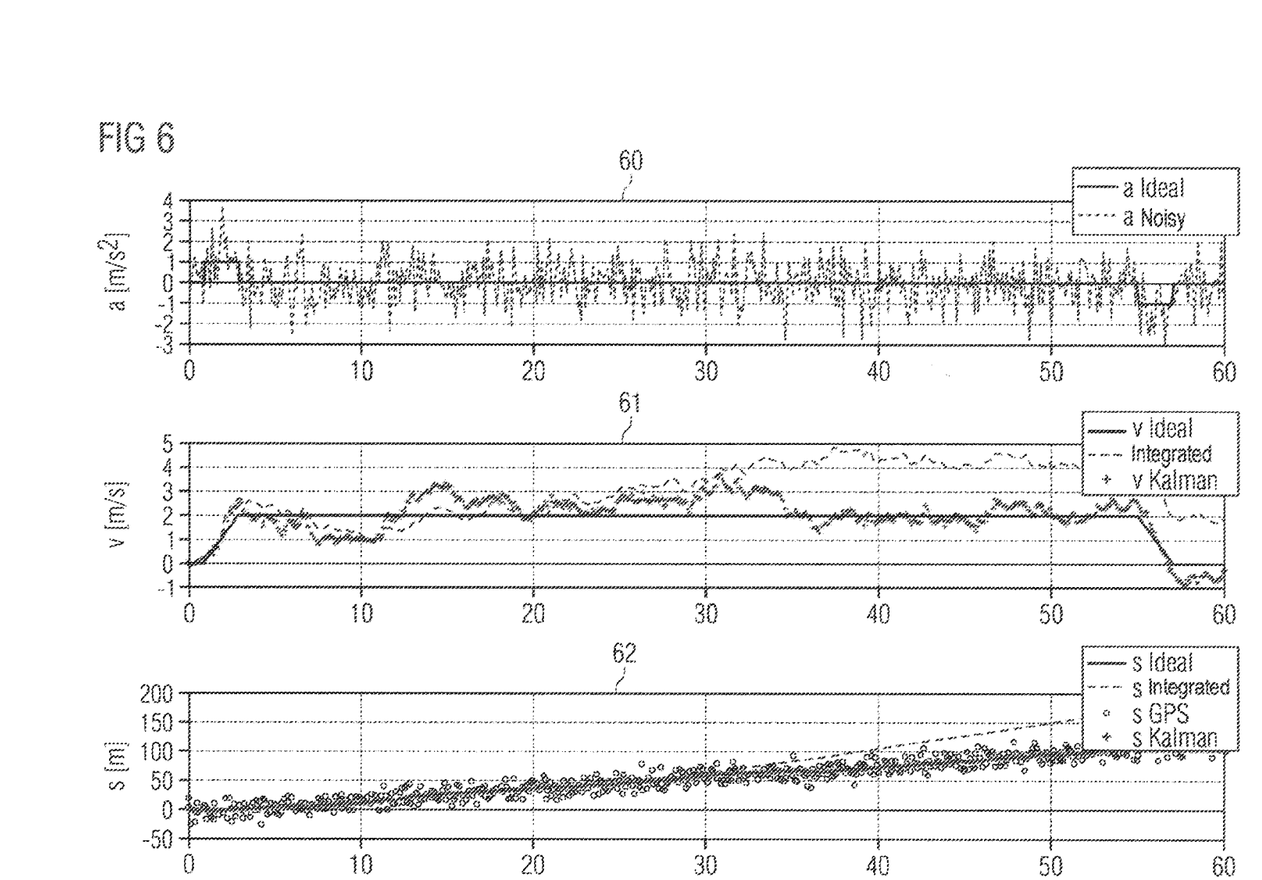
FIG. 6 shows diagrams for illustrating a combination of various measurements for illustrating embodiments.

Example graphs are shown in FIG. 6 for illustrating the improvement in the measurement quality in the case of various sensors by way of a combination by means of Kalman filtering. Using a dashed curve, a diagram 60 shows acceleration measurement values, which, as illustrated, are afflicted by significant noise. A blue curve in the graph 60 shows ideal values without noise.

In a diagram 61, a dashed curve shows the integrated (noisy) acceleration values from diagram 60, crosses show values that are obtained by Kalman filtering and a solid line shows ideal values. Circles in FIG. 62 show measurements of a location determination, which is comparatively inaccurate. Here too, a significant improvement can be achieved by way of Kalman filtering by virtue of the acceleration measurement values being combined with the location measurement values, as is visible from the crosses in diagram 62, which lie close to an ideal line. The drift that typically occurs when integrating noisy measurement values, as symbolized by dashed curves in diagram 61 and diagram 62, is avoided as a result thereof.

Consequently, the example in FIG. 6 shows that a significant increase in the accuracy can be achieved by combining measurement values, for example by means of Kalman filtering. Ultimately, this allows positioning accuracies of the measuring head to within less than 0.1 mm to be achieved, which facilitates a highly accurate measurement in embodiments.

In view of the above-illustrated variations, alterations and alternatives renders it clear that the illustrated embodiments should not be construed as limiting.

The invention claimed is:

1. A device for measuring objects, the device comprising:
   a mobile base for moving the device through a spatial region;
   a kinematic unit attached to the mobile base and a measuring head attached to the kinematic unit, wherein the kinematic unit is configured to move the measuring head relative to the mobile base, wherein the measuring head comprises a sensor for measuring objects; and
   a controller configured to:
      obtain measurements of an object via the sensor of the measuring head, the measurements obtained over multiple measurement positions of the measuring head relative to the object;
      estimate a trajectory followed by the measuring head over the multiple measurement positions, based on processing sensor data from two or more types of sensors of the device that are used to track movement of the measuring head relative to the object; and
      combine the measurements of the object into a single point cloud having a uniform coordinate system, on the basis of the estimated trajectory.

2. The device of claim 1, wherein the mobile base has wheels or said mobile base is a rail-mounted mobile base.

3. The device of claim 1, further comprising a navigation device for navigating the mobile base through the spatial region.

4. The device of claim 3, wherein the navigation device comprises a differential GPS system and/or a camera device.

5. The device of claim 1, wherein the two or more types of sensors of the device that are used to track movement of the measuring head relative to the object comprise:
   a camera that provides images of the measuring head relative to the object; and
   an inertial measurement unit that provides angular or acceleration measurements of the kinematic unit.

6. The device of claim 5, wherein the controller is configured to estimate the trajectory followed by the measurement head over the multiple measurement positions by processing a combination of data via a Bayesian algorithm or a Kalman-filter algorithm, the combination of data comprising image data from the images provided by the camera, the angular or acceleration measurements provided by the inertial measurement unit, and control commands used to command movement of the mobile base or the kinematic unit or both, to move the measurement head over the multiple measurement positions.

7. The device of claim 1, wherein the measurements obtained for the object via the measuring head are topographical measurements corresponding to multiple locations along a surface of the object, and wherein, to combine the measurements of the object into the single point cloud having the uniform coordinate system, the controller is configured to translate the topographical measurements from the multiple locations into the uniform coordinate system, to obtain a three-dimensional (3D) model of the object.

8. The device of claim 5, wherein the camera comprises a 3D camera.

9. The device of claim 1, wherein the sensor of the measuring head comprises an optical sensor.

10. The device of claim 9, wherein the optical sensor comprises a confocal chromatic multi-spot sensor.

11. A method of obtaining measurements, the method comprising:
   obtaining measurements of an object via a sensor of a measuring head, the measurements obtained over multiple measurement positions of the measuring head relative to the object, the measuring head included in a device that comprises the measurement head, a kinematic unit for moving the measuring head, and a mobile base to which the kinematic unit is attached, the mobile base configured for moving through a spatial region;
   estimating a trajectory followed by the measuring head over the multiple measurement positions, based on processing sensor data from two or more types of sensors of the device that are used to track movement of the measuring head relative to the object; and
   combining the measurements of the object into a single point cloud having a uniform coordinate system, on the basis of the estimated trajectory.

12. The method of claim 11, further comprising commanding movements of the mobile base or the kinematic unit or both, to move the measuring head to respective ones of the multiple measurement positions.

13. The method of claim 12, wherein the single point cloud is a 3D point cloud of a region of interest.

14. The method of claim 11, wherein the two or more types of sensors of the device that are used to track movement of the measuring head relative to the object comprise:
   a camera that provides images of the measuring head relative to the object; and
   an inertial measurement unit that provides angular or acceleration measurements of the kinematic unit.

15. The method of claim 14, wherein estimating the trajectory followed by the measurement head over the multiple measurement positions comprises processing a combination of data via a Bayesian algorithm or a Kalman-filter algorithm, the combination of data comprising image data from the images provided by the camera, the angular or acceleration measurements provided by the inertial measurement unit, and control commands used to command movement of the mobile base or the kinematic unit or both, to move the measurement head over the multiple measurement positions.

16. The method of claim 11, wherein the measurements of the object obtained via the sensor head are topographical measurements corresponding to multiple locations along a surface of the object, and wherein combining the measurements of the object into the single point cloud having the uniform coordinate system comprises translating the topographical measurements from the multiple locations into the uniform coordinate system, to obtain a three-dimensional (3D) model of the object.

17. A non-transitory storage medium storing a computer program for controlling a device for measuring objects, the computer program comprising program instructions that, when executed by a controller of the device, cause the device to:
   obtain measurements of an object via a sensor of a measuring head, the measurements obtained over multiple measurement positions of the measuring head relative to the object, the measuring head included in the device, wherein the device further comprises a kinematic unit for moving the measuring head, and a mobile base to which the kinematic unit is attached, the mobile base configured for moving through a spatial region;

estimate a trajectory followed by the measuring head over the multiple measurement positions, based on processing sensor data from two or more types of sensors of the device that are used to track movement of the measuring head relative to the object; and combine the measurements of the object into a single point cloud having a uniform coordinate system, on the basis of the estimated trajectory.

18. A device comprising:

a mobile base configured for moving within a spatial region responsive to first movement commands;

a kinematic unit attached to the mobile base and configured for moving relative to the mobile base responsive to second movement commands;

a measuring head attached to the kinematic unit and having a measurement sensor configured for making topographical measurements of an object positioned within the spatial region;

two or more types of tracking sensors for tracking movement of the measuring head; and a controller configured to:

generate a series of first and second movement commands, to position the measurement head at respective measurement positions relative to the object;

obtain respective topographical measurements of the object at each of the respective measurement positions;

estimate a trajectory of the measuring head through the respective measurement positions, based on a combined processing of sensor data from the two or more types of tracking sensors and the series of first and second movement commands; and translate the respective topographical measurements of the object into a uniform coordinate system, based on the estimated trajectory.

* * * * *